United States Patent [19]

Nakanishi et al.

[11] Patent Number: 5,573,579
[45] Date of Patent: Nov. 12, 1996

[54] METHOD FOR PRODUCING FRICTION MATERIAL

[75] Inventors: Keita Nakanishi, Kobe; Takuo Ishihara, Osaka, both of Japan

[73] Assignee: Osaka Gas Company, Ltd., Osaka, Japan

[21] Appl. No.: 403,108

[22] Filed: Mar. 13, 1995

[30] Foreign Application Priority Data

Mar. 17, 1994 [JP] Japan ................................. 6-087111

[51] Int. Cl.⁶ ........................................... C09K 3/14
[52] U.S. Cl. ........................... 106/36; 264/319; 264/330; 523/149
[58] Field of Search ............................. 106/36; 264/330, 264/319; 188/251 A; 523/149

[56] References Cited

U.S. PATENT DOCUMENTS

| | | | |
|---|---|---|---|
| 4,019,912 | 4/1977 | Augustin | 106/36 |
| 4,175,070 | 11/1979 | Klein et al. | 106/36 |
| 4,203,936 | 5/1980 | Kiwak et al. | 106/36 |
| 5,127,949 | 7/1992 | Nakazawa et al. | 106/36 |
| 5,217,528 | 6/1993 | Seki | 106/36 |
| 5,308,392 | 5/1994 | Morita et al. | 106/36 |
| 5,428,081 | 6/1995 | Song | 106/36 |
| 5,433,774 | 7/1995 | Kapl et al. | 106/36 |

FOREIGN PATENT DOCUMENTS

| | | | |
|---|---|---|---|
| 3-194227 | 8/1991 | Japan | 106/36 |
| 1239134 | 6/1986 | U.S.S.R. | 106/36 |
| 995198 | 6/1965 | United Kingdom | 106/36 |
| 2217725 | 11/1989 | United Kingdom | 106/36 |

*Primary Examiner*—Anthony Green
*Attorney, Agent, or Firm*—Varndell Legal Group

[57] ABSTRACT

A method for producing friction material free of pill having at least 2 mm in shorter diameter comprising mixing dispersion medium and friction base comprising carbon fiber having weighted mean fiber length of at least 0.3 mm, binder and friction modifier to form a dispersion ranging in a solid content concentration of 0.5 to 50% by weight, filtering the dispersion, drying a filter cake and forming the cake.

5 Claims, 1 Drawing Sheet

METHOD FOR PRODUCING FRICTION MATERIAL

INDUSTRIAL FIELD

The invention relates to a method for producing friction material for damping rotating part of automobiles, airplanes, construction machines, motor bicycles.

BACKGROUND ART

A great amount of asbestos has been employed as heat-resistant reinforcement fibers in conventional friction material. However, asbestos-containing friction material producing wear powder by friction is going to be replaced by friction material containing other fiber materials. As substitute fiber materials, proposed and employed are aramid fibers (DUPONT TORAY KEVLER CO., LTD, Technical Document DTK-T01 91.2), acryl fibers (Japanese Unexamined Patent Publication Nos. 106133/1987 and 183950/1988) and carbon fibers (Japanese Unexamined Patent Publication Nos. 157671/1980 and 104378/1980, Japanese Examined Patent Publication No. 4455/1984). Carbon fiber is excellent in heat-resistant, wear-resistant and reinforcing properties ("Carbon Fiber", Mar. 1, 1986, KINDAI HENSYUSYA, pp557–567).

However, it is very difficult to obtain carbon fiber-containing friction material having a practical coefficient of friction and excellent properties in heat-resistance, wear-resistance and reinforcement, since carbon fibers has a drawback to decrease the coefficient of friction. When long carbon fibers are employed, friction material product having stable characteristics in strength, friction properties and wear-resistance can not be manufactured, since homogeneous mixing of base components can not be performed leading to formation of pills. In contrast, when short carbon fibers are employed, a great amount of particles or fibers of ceramics may be added so as not to decrease a coefficient of friction too much. In this case, friction material containing ceramics has a drawback to attack an element provided with the friction material. Further, aramid fibers, ceramics fibers and like reinforcing fibers must be blended in a great amount into the friction material because of insufficient reinforcement action of short carbon fibers.

Friction material is usually produced by the steps of mixing, molding and postcuring of raw material. Examples of mixing process of raw material for production of friction material are a dry process conducted by mixing constituents of raw material using mixers of V-type, planetary-type, cylinder-type, high speed fluid-type, rotating disc-type, pag mill-type, monoaxis rotary-type, etc., and a wet process conducted by adding a small amount of solution prepared by dissolving a binder in water or toluene, alcohols, methylethylketone and like organic solvents to a raw material constituents mixture prepared in a dry process, followed by kneading the mixture using mixers, such as wet mill, screw extruder, kneader, pag-mill, etc. until viscous and slurry product are obtained. However, it is very difficult to obtain a uniform mixture by the methods mentioned-above, when long carbon fibers are employed. Fiber components will be cut into short length due to strong shear force, if mixing is conducted in a severe condition for the purpose of obtaining a uniform mixture.

It is a major object of the invention to provide a method for producing friction material by effectively utilizing excellent properties of carbon fibers in heat-resistance, wear-resistance and reinforcement, and inhibiting a drawback of carbon fibers lowering coefficient of friction in some of use conditions.

It is another object of the invention to provide a method for enabling uniform mixing, when friction material containing fiber components are produced.

DISCLOSURE OF THE INVENTION

The inventors have conducted an extensive research in considering the problems of the prior art mentioned above, and succeeded in producing friction material having very little variability in strength, practical coefficient of friction and high strength, and inhibiting formation of pills having at least 2 mm in shorter diameter, although carbon fibers having a weighted mean fiber length of at least 0.3 mm are employed.

Thus, the present invention relates to the following methods for producing friction material:

Item 1. A method for producing friction material free of pills having at least 2 mm in shorter diameter comprising mixing dispersion medium and friction base (hereinafter referred to as friction base (I)) comprising carbon fiber having a weighted mean fiber length of at least 0.3 mm, binder and friction modifier to form a dispersion ranging in a solid content concentration of 0.5 to 50% by weight, filtering the dispersion, drying filter cake and molding the cake.

Item 2. The method for producing friction material according to item 1 wherein the carbon fiber ranges in an amount of 0.5 to 20% by weight of the friction base (friction base (I)).

Item 3. A method for producing friction material substantially free of pills having at least 2 mm in shorter diameter in which carbon fiber is vertically orientated to a frictional surface comprising mixing dispersion medium and friction base (hereinafter referred to as friction base (I)) comprising carbon fiber having a weighted mean fiber length of at least 0.3 mm, binder and friction modifier to form a dispersion ranging in a solid content concentration of 0.5 to 50% by weight, filtering the dispersion to orientate the carbon fiber substantially parallel to a filter face, drying filter cake obtained, followed by (1) cutting the filter cake dried in a vertical direction to the orientation of carbon fiber and molding the cake; or (2) molding the filter cake dried and cutting the filter cake in a vertical direction to the orientation of carbon fiber.

Item 4. A method for producing friction material free of pills having at least 2 mm in shorter diameter comprising mixing dispersion medium and friction base (hereinafter referred to as friction base (II)) comprising tentacle-like branched organic fiber having a weighted mean fiber length of at least 0.3 mm and a mean fiber diameter of up to 50 μm, binder and friction modifier to form a dispersion ranging in a solid content concentration of 0.5 to 50% by weight, filtering the dispersion, drying a filter cake and molding the cake.

Item 5. The method for producing friction material according to item 4 wherein the friction base (friction base (II)) further comprises carbon fiber ranging in a weighted mean fiber length of at least 0.05 mm.

In the specification, "a weighted mean fiber length" means the fiber length defined by the following equation (1):

$$X = \frac{\sum_{i=1}^{n} m_i X_i}{W} \quad (1)$$

wherein
$\overline{X}$ represents a weighted mean fiber length, when length of n pieces of fiber are measured;
$m_i$ represents a weight of number "i" fiber;
$X_i$ represents a length of number "i" fiber;
$W$ represents a total weight of n pieces of fibers.

When a diameter "$d_i$" and a specific weight "$\gamma_i$" are substantially the same in any "i" number (i=1 to n) and correspond to "d" and "$\gamma$", respectively, the equation (1) is equal to the equation (2) shown below:

$$\overline{X} = \frac{\sum_{i=1}^{n} \frac{\pi}{4} (d_i)^2 \times X_i \times \gamma_i \times X_i}{\sum_{i=1}^{n} \frac{\pi}{4} (d_i)^2 \times X_i \times \gamma_i} \quad (2)$$

$$= \frac{\sum_{i=1}^{n} \frac{\pi}{4} d^2 \times X_i \times \gamma \times X_i}{\sum_{i=1}^{n} \frac{\pi}{4} d^2 \times X_i \times \gamma} = \frac{\sum_{i=1}^{n} (X_i)^2}{\sum_{i=1}^{n} X_i}$$

"Pill" means an inhomogeneous and bulky part formed by interlocking fibers three-dimensionally. Pills tend to decrease strength and coefficient of friction leading to easy wear of friction material. Friction material is, therefore, preferably free of pills having at least 2 mm in shorter diameter, more preferably free of pills having at least 1 mm in shorter diameter, most preferably free of pills. Sizes of pills are determined by a scale-up photograph on the cutting surface of friction material as shown in FIGS. 1 and 2.

In items 1, 2 and 3, "friction base" comprising carbon fiber having a weighted mean fiber length of at least 0.3 mm, binder and friction modifier is defined as "friction base (I)".

In items 4 and 5, "friction base" comprising tentacle-like branched organic fiber having a weighted mean fiber length of at least 0.3 mm and a mean fiber diameter of 50 μm, binder and friction modifier is defined as "friction base (II)". The friction base (II) may further comprise carbon fiber ranging in a weighted mean fiber length of at least 0.05 mm.

Further, "friction base" hereinafter means both friction base (I) and friction base (II).

According to the invention, as carbon fibers, each fiber derived from pitch, polyacrylonitriles (PAN), phenolics, rayons and the like may be used. Carbon fiber derived from anisotropic pitch is preferable to improve coefficient of friction and strength of friction material the more. Carbon fiber having a weighted mean fiber length of at least 0.3 mm are employed. Employing carbon fiber having a weighted mean fiber length of less than 0.3 mm result in an excessive decrease of coefficient of friction of friction material and an insufficient reinforcing effect. The weighted mean fiber length of carbon fiber is preferably up to about 15 mm, more preferably up to about 10 mm. Carbon fiber having a weighted mean fiber length of more than 15 mm may cause scattering of properties, such as coefficient of friction, wear rate and strength of friction material, even if pills are not formed in friction material. The weighted mean fiber length of carbon fiber ranges about 0.5–15 mm, preferably about 1.0–15 mm, more preferably about 1–10 mm so as to reduce an amount of a friction modifier and other reinforcement fibers blended leading to imparting high coefficient of friction and sufficient reinforcing effect to friction material. A diameter of carbon fiber is not specifically limited to, but preferably up to about 50 μm, more preferably about 0.5–25 μm, most preferably about 8–20 μm. When employing carbon fiber having a diameter of up to about 50 μm, an aspect ratio (length/diameter) of carbon fiber is large enough leading to imparting a sufficient reinforcing effect, thereby preferable.

The amount of carbon fiber ranges preferably about 0.5–20% by weight, more preferably about 0.5–10% by weight, most preferably about 0.5–5% by weight based on an amount of friction base (I) for producing friction material. When the amount of carbon fiber ranges from about 0.5–20% by weight, friction material obtained has high coefficient of friction, sufficient heat-resistance, wearing properties and reinforcing action, thereby preferable.

In the specification, "friction base for producing friction material" means a mixture of all component included in a product of friction material.

In order to improve homogeneous dispersing properties of friction material the more, tentacle-like branched organic fibers (fibrillated organic fibers), such as aramid fiber, acrylic fiber, polyester fiber, rayon fiber, polypropylene fiber, fluorine-contained fiber, phenolic fiber, polyvinylalcohol fiber, polyurethane fiber, polyethylene fiber, polybenzimidazole fiber, pulp, cotton, etc., may be blended into friction material. Aramid fiber and acrylic fiber are preferably employed from the viewpoint of heat-resistance, strength and price. A total length of organic fibers including a branched part is at least about 0.3 mm, preferably about 0.3–15 mm, more preferably about 0.5–15 mm, most preferably about 1–10 mm. When a total length of organic fibers including a branched part is less than 0.3 mm, a reinforcing effect of organic fibers is not sufficiently imparted. In contrast, when a total length of organic fibers including a branched part is more than 15 mm, the reinforcing effect become scattering. The organic fibers having the specific shape mentioned above may be produced by treating conventional pulp-like, filament or roving fiber or short fiber with a beating equipment.

A diameter of organic fibers at an unbranched center part is up to about 50 μm, preferably about 0.5–25 μm, more preferably about 8–20 μm. When the diameter is up to about 50 μm, an aspect ratio (fiber length/fiber diameter) of organic fibers is large enough leading to imparting a sufficient reinforcing effect. To impart a more reinforcement effect, a diameter of organic fibers in a branched part is preferably 1/5 times as much as a diameter of an unbranched part. An amount of organic fibers blended is preferably about 0.1–10% by weight, more preferably about 0.1–5% by weight based on the friction base (II) for producing friction material. When the amount of organic fibers blended ranges about 0.1–10% by weight, organic fibers are dispersed homogeneously leading to imparting sufficient heat-resistant properties.

Examples of binders are conventional novolak-type and resol-type phenolic resin, epoxy resin, vinyl acetate resin, urethane resin, melamine resin, crosslinked aromatic thermosetting resin, etc. Binders are employed singly or in a mixture thereof. Phenolic resin and crosslinked aromatic thermosetting resin are preferable to improve heat-resistant properties of friction material. An amount of binders preferably ranges about 3–50% by weight, more preferably 3–15% by weight based on the amount of friction base for producing friction material. When the amount of binders ranges about 3–50% by weight, the friction material has a strong binding power and a small depth of wear, and keeps a satisfactory heat-resistance.

Examples of friction modifier are powder and particle of metals such as copper, brass, bronze, iron, stainless steel, etc.; powder and particle of inorganic compounds such as graphite, barium sulfate, alumina, magnesia, chromium oxide, wollastonite, calcium carbonate, diatomite, dolomite, magnesium carbonate; powder and particle of organic compounds such as cashew dust, rubber dust etc.; fibers of metals, such as copper, brass, iron, stainless steel, etc.; inorganic fibers such as rock wool, ceramics fiber, glass fiber, potassium titanate fiber, boron fiber, silicon carbide fiber, etc. The friction modifiers mentioned above may be employed singly or in a mixture thereof according to required performance of friction material. A particle diameter of friction modifiers is not specifically limited to, but suitably determined according to required properties of friction material. For example, the particle diameter of a friction modifier ranges; about 10 μm to 5 mm when using metal; about 1 μm to 1 mm when using inorganic compounds; about 10 μm to 1 mm when using organic compounds.

When powder, particle or fiber metal is employed as a friction modifier, the amount of metal added is preferably about 5–80% by weight, more preferably about 10–50% by weight based on the amount of friction base for producing friction material. When the amount of metal added ranges about 5–80% by weight, coefficient of friction of friction material is stable and sufficient, and depth of wear of an element adjacent to friction material is suppressed in a small amount, thereby preferable.

When graphite is employed as a friction modifier, the amount of graphite added is preferably about 0.5–30% by weight, more preferably about 3–20% by weight based on the amount of the friction base for producing friction material. When the amount of graphite added ranges about 0.5–30% by weight, depth of wear of friction material is suppressed in a small amount, and any irritating noise does not occur, thereby preferable.

When cashew dust, rubber dust and like organic materials are employed as a friction modifier, the amount of organic material added preferably ranges about 1–10% by weight. When the amount of such organic materials added ranges within about 1–10% by weight, adjustment of coefficient of friction at low temperature is easy, and depth of wear is supressed in a small amount, thereby preferable.

Examples of other friction modifier are metal sulfides, metal oxides, barium sulfate, etc. The above-mentioned friction modifiers are employed singly or in a mixture thereof. A total amount of friction modifiers employed in the friction base preferably ranges about 40–96.9% by weight.

The friction material of the above-mentioned item 1 of the invention includes carbon fiber, binder and friction modifier in a proportion shown below;
carbon fiber: binder: friction modifier=0.5–20% by weight: 3–50% by weight: 40–96.5% by weight; preferably
carbon fiber:binder:friction modifier=0.5–10% by weight:3–15% by weight:80–96.5% by weight.

Further, the friction material of the above-mentioned item 5 of the invention includes organic fiber, binder and friction modifier in a proportion shown below;
organic fiber:binder:friction modifier=0.1–10% by weight:3–50% by weight:40–96.9% by weight; preferably
organic fiber:binder:friction modifier=0.1–5% by weight:3–15% by weight:80–96.9% by weight.

Furthermore, the friction material of the above-mentioned item 6 of the invention includes carbon fiber, organic fiber, binder and a friction modifier in a proportion shown below;
carbon fiber:organic fiber:binder:friction modifier=0.5–20% by weight:0.1–10% by weight:3–50% by weight:40–96.4% by weight; preferably
carbon fiber:organic fiber:binder:friction modifier=0.5–10% by weight:0.1–5% by weight:3–15% by weight:80–96.4% by weight.

When a total amount of friction modifier is within the above-mentioned ranges, adjustment of coefficient of friction, wear rate, shaping and friction is easily performed.

The friction material of the invention is produced by dispersing and mixing raw material for producing friction material in a dispersion medium, followed by drying the dispersion and molding.

Examples of a dispersion medium are water, toluene, methylethylketone, methanol, ethanol, acetone, carbon tetrachloride, chloroform, xylene, benzene, methylisobutylketone, etc. Water is preferable in considering safety while working, treatment of discharge and price. When attaching importance to yield, it is preferable to select a dispersion medium which does not dissolve a binder and to select temperature and time for dispersion treatment in which a binder is dissolved as little as possible, since a binder may be dissolved in combination with some of dispersion medium. A dispersion medium except for water is employed, when employing a binder which makes a curing reaction proceed in the presence of water while drying. In the production process, non-flammable fluids (e.g. carbon tetrachloride, chloroform, etc.) without need of explosion-proof remedy are preferable.

When mixing raw material for producing friction material, the mixing procedure is preferably conducted by adding fiber components of from a longer to shorter weighted mean fiber length successively to a dispersion medium, followed by adding powder components of binder and friction modifier having from smaller to higher specific gravity successively to the dispersion medium. When this procedure is conducted in reverse sequence, for example, formation of homogeneous mixture becomes difficult. For example, a fiber component having a shorter weighted mean fiber length is added first, homogeneous mixing becomes difficult. When a powder component having a larger specific gravity is added to a dispersion medium first, homogeneous mixture can hardly be obtained due to sedimentation of the powder component.

Each fiber component of friction base is preferably pre-dispersed in a dispersion medium for a variety of time according to a type of fiber component by mixing for 1 minutes to 5 hours, and then employed as a dispersion. For example, carbon fibers and ceramics fibers are preferably agitated for 1 minute to 1 hour, tentacle-like branched organic fibers are preferably agitated for 30 minutes to 5 hours, the dispersions are employed thereafter.

Fiber components are preferably dispersed in a dispersion medium, after fibrillated and mixed with a beating equipment or open mixer, when fiber components are not likely to be dispersed, or when fiber components having different properties or shapes are combined (in the cases that two or more carbon fibers are combined, carbon fiber and tentacle-like branched organic fiber are combined, metal fiber or inorganic fiber is employed, etc.).

In addition, powder components are preferably pre-dispersed in a dispersion medium to provide the mixing process mentioned above.

After adding all raw material components such as carbon fiber, binder, friction modifier, etc., and a dispersion medium, the mixture is further agitated and mixed for about 10 seconds to 10 minutes. Agitation can be conducted by any step, as long as a homogeneous mixture may be formed. A method for rotating an agitating blade in a liquid and a method for bubbling air or steam are exemplified. A solid content (carbon fiber, binder, friction modifier, organic fiber, etc.) concentration in a dispersion medium, which is variable in accordance with fiber length, ranges about 0.5–50% by weight, preferably about 0.5–25% by weight, more preferably about 0.5–10% by weight. When the solid content concentration ranges about 0.5–50% by weight, production cost is low and homogeneous mixture is formed in a sufficient amount of dispersion medium, thereby preferable.

Friction material prepared from heterogeneous mixture is low in strength and coefficient of friction, and easily worn out. When vigorous kneading is conducted for obtaining a homogeneous mixture, fiber components in a mixture are cut leading to reducing strength and coefficient of friction of friction material prepared from the heterogeneous mixture. The solid content concentration in a dispersion medium is, therefore, very important.

In the mixing step mentioned above, fibers, powders and particles are moved and dispersed in a dispersion medium smoothly. In addition, fiber components are not cut substantially. After the mixing step, therefore, a homogeneous mixture capable of producing friction material substantially free of pills is obtained in a dispersion medium.

Although the homogeneous mixture mentioned above may be subjected to a solid-liquid separation step, adding a flocculant to the homogenous mixture to sediment and separate a homogeneous solid mixture is preferable so as not to occur deviation of components during a solid-liquid separation step. Examples of flocculants are sulfate band, ferrous chloride, ferric chloride, polyaluminium chloride, and like inorganic compounds; polyacrylamide, sodium polyacrylate, sodium alginate, starch, gelatine, carboxymethylcellulose, water-soluble urea resin, polyethyleneimine and like polymers. Synthetic polymers which are stable and excellent in cohesion are preferable as flocculants. An amount of a solid content in a flocculant added ranges about 0.1–30% by weight based on an amount of a solid content. When the amount of a flocculant added ranges about 0.1–30% by weight, a cohesive effect is imparted enough, and heat-resistant properties of friction material are maintained.

A resin soluble in a liquid employed in the dispersion-mixing step or a binder for cohesion dispersible in a dispersion medium in a sol form is preferable for more effective cohesion. The binder for cohesion acting as a binder or friction modifier is preferable. For example, when water is employed as a dispersion medium, water-soluble phenolic resin, epoxy resin, polyester resin, polyvinyl alcohol, etc., may be employed as a soluble resin, and alumina sol, silica sol, magnesium hydroxide sol, titania sol, zirconia sol, mullite sol etc., may be employed as a sol. When the binder for cohesion is employed, the binder for cohesion is added to the mixture before adding a flocculant. The amount of binder for cohesion added is not limited, as long as the amount of binder and friction modifier is within the range defined above, when the binder for cohesion is regarded as a part of a binder or friction modifier. Since a binder for cohesion, i.e., water-soluble resin or liquid dispersible sol for dispersion may cause decrease of function of friction material (heat-resistance, wearing properties, coefficient of friction, etc.), the amount of binder for cohesion added preferably ranges about 0.1–10% by weight based on a solid content. When the amount of binder for cohesion added is too small, a desired effect is not exerted sufficiently. In contrast, when the amount of binder for cohesion added is excessive, functions of friction material may be decreased.

In order to elevate a cohesive effect, pH adjustment of dispersion medium containing homogeneous solid mixture is performed after adding binder for cohesion to the mixture. The pH adjustment may be conducted by adding ammonium sulfate, ammonium chloride, ammonium acetate, and like salts; hydrochloric acid, sulfuric acid, acetic acid and like acids; sodium hydroxide, ammonia and like bases in accordance with a sort of binder for cohesion and flocculants. In said process of cohesion , a mixture having a homogeneous composition in which fibers are opened, is separated from a dispersion medium to form a soft solid material.

The soft solid material obtaind from the cohesion process is then filtrated. Before filtration, removing a liquid to be separated from the sedimented and separated material by decantation is preferable. Filtration is conducted by belt filter, filter press and like optional-type filters. Filter fabric employed for filtration is not specifically limited to, but woven fabric and unwoven fabric made of metals, organic fibers, inorganic fibers and like optional materials may be employed. An open diameter of filter fabric preferably ranges about 10–400 mesh. When the open diameter of filter fabric ranges about 10–400 mesh, filtration is performed in a short time, and sufficient yield is accomplished. A volatile matter in a solid material obtained by filtration may be removed by distillation in the successive thermoforming process, but preferably dried and removed before thermoforming. The fiber components are not cut substantially in the filtration process. The solid material thus obtained is then molded. The molding may be conducted by applying pressure according to the procedure of uniaxial pressure application, biaxial pressure application, hydrostatic pressure, and the like under heating using metal mold, rubber mold, plastic mold, etc. Molding temperature is determined by selecting suitable range of temperature according to rheological and curing properties of a binder employed. In order to obtain 80% or more density based on the density calculated from constituents of friction material, the temperature is preferably about 120°–200° C., more preferably about 150°–200° C. A molding pressure is different according to a molding process selected, but 5 MPa or more is preferable so as to obtain 80% or more density based on the density calculated from constituents of friction material. Fiber components are not cut in the molding process, either.

The molded part obtained is then post cured for complete curing. Temperature and time of post cure process are different according to composition of the molded part, but preferably about 180°–300° C. and about 1–10 hours. The molded part is preferably heat-treated at about 400°–600° C. for about 1 second to 10 minutes after post cure so as to improve initial friction properties.

In the carbon fiber-containing friction material mentioned above, friction material in which carbon fibers are substantially vertically oriented to wearing surface is preferable to elevate coefficient of friction the more and decrease wear the less. In the specification, "vertically oriented" means that a proportion of fibers, which has 2 or less of longer/shorter diameter ratio, existed on wearing surface is 55% or more, preferably at least 70%, more preferably at least 90%. Carbon fibers exposed on a friction surface become circle when carbon fibers are vertically placed to the surface, ellipse when obliquely placed to the surface, and substantially rectangle when parallely placed to the surface. The longer diameter and shorter diameter are applied to carbon fibers on the friction surface. When the ratio is 55% or more, wear of friction material is decreased and coefficient of friction thereof is maintained at high value to a long period, thereby preferable. The friction material containing carbon fibers vertically oriented to a friction surface can be produced as shown below.

In the process of producing solid material by filtration of homogeneous mixture of the above-mentioned method for producing friction material, carbon fibers are not completely fixed in the solid material. Carbon fibers can be, therefore, parallely oriented to a sedimentation surface and filtration surface by applying power in a vertical direction to the sedimentation or filtration surface. For example, it is preferable to sufficiently move and distort carbon fibers by lowering a solid content concentration in a mixing process as much as possible so as to parallely orient carbon fibers to the sedimentation surface in the process of sedimentation. In the viewpoint of homogeneous mixing and economical effeciency, a solid content concentration preferably ranges about 0.5–25% by weight, more preferably about 0.5–10% by weight. It is preferable to forcedly transfer solid material to the filtration surface by suction or compression for the purpose of orientating carbon fibers to the filtration surface parallely in the process of filtration. The solid content concentration regulated by decantation, in analogy with the sedimentation process mentioned above, preferably ranges about 0.5–25% by weight, more preferably 0.5–10% by weight. Orientation of carbon fibers are not changed so much in the process of molding the solid material thus obtained. In the end, friction material in which carbon fibers are substantially vertically orientated to a friction surface is produced by vertically cutting to the fibers a molded part in which carbon fibers are parallely orientated.

Said method for producing carbon fiber-containing friction material may be applied to a process for producing friction material employing friction base (II) consisting of tentacle-like branched organic fibers having a weighted mean fiber length of at least 0.3 mm and a mean fiber diameter of up to 50 μm, a binder and a friction modifier. The organic fibers employed for improvement of homogeneous dispersion of said carbon fiber-containing friction material are also employed as tentacle-like branched organic fibers having a weighted mean fiber length of at least 0.3 mm and a mean fiber diameter of up to 50 μm. A mixing process of the friction base is performed in the same manner as above. Fiber components are preferably fibrillated and mixed with a beating equipment or open mixer, before dispersed in a dispersion medium, when fiber components are not likely to be dispersed, or when fiber components having different properties or shapes are combined (in the cases that two or more carbon fibers are combined, carbon fiber and tentacle-like branched organic fiber are combined, metal fiber or inorganic fiber is employed, etc.). Filtration, molding, post cure, etc., are performed in the same manner as the method for producing carbon fiber-containing friction material.

According to the item 1 of the invention, carbon fibers are not cut, and friction material which has high strength and coefficient of friction, and decreased wear, the material which is free of pills having at least 2 mm in shorter diameter, is obtained.

According to the item 3 of the invention, friction material in which carbon fibers are not cut, vertically oriented to a friction surface, the friction material which is free of pills having at least 2 mm in shorter diameter and higher in coefficient of friction and lower in wear, is obtained.

According to the item 4 of the invention, friction material in which tentacle-like branched organic fibers are not cut, and friction material which is free of pills having at least 2 mm in shorter diameter and has high strength and coefficient of friction, is obtained.

According to the item 5 of the invention, friction material having low wear is obtained.

BEST MODE OF CARRYING OUT THE INVENTION

Figure 1:
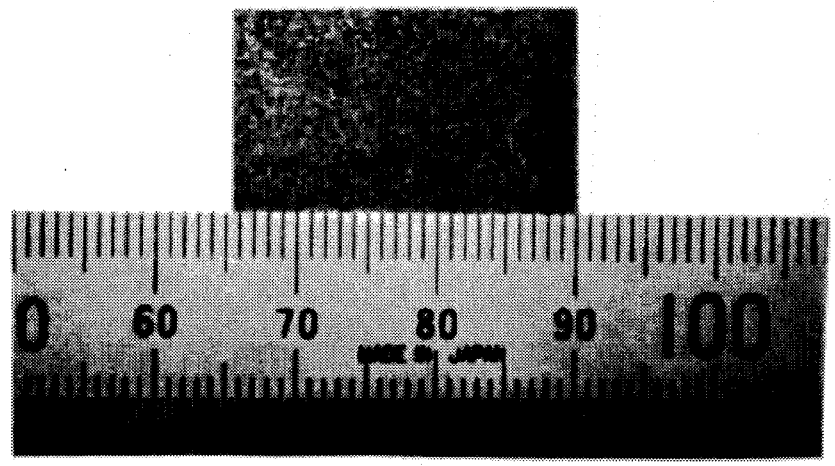
FIG. 1 is a photograph of optical microscope showing a cutting surface of friction material prepared in Example 1.

The results of preparation and evaluation of friction material by using carbon fiber, aramid fiber, phenolic resin as a binder, rock wool, sepiolite, wollastonite, cashew dust, graphite and barium sulfate are shown in examples.

EXAMPLE 1

Each dispersion was prepared according to the following procedure.

(a) A 2.3 g of carbon fiber (product of Donac Co., Ltd., S-231; mean fiber diameter=13 μm, weighted mean fiber length=3.0 mm, tensile strength=800 MPa, tensile modulus of elasticity=40 GPa) was dispersed in 375 ml of tap water by agitation with a motor for 1 minute.

(b) A 5.7 g of rock wool (Nihon Cement Co., Ltd., CMF#3,000) was dispersed in 375 ml of tap water by agitation with a motor for 30 minutes.

(c) A 11.4 g of phenolic resin (product of Kanebo Ltd., BELLPEARL S-899) was dispersed in 125 ml of tap water with a spatula.

(d) A 6.8 g of cashew dust (product of Cashew Co., Ltd., H-9109) was dispersed in 125 ml of tap water with a spatula.

(e) A 18.4 g of graphite (product of Chuetsu Graphite Works Co., Ltd., G-3) was dispersed with a spatula in 125 ml of tap water.

(f) A 42 g of barium sulfate (product of Sakai Chemical Industry Co., Ltd., A-15) was dispersed with a spatula in 125 ml of tap water.

The above-mentioned dispersions (a) and (b) were combined and homogeneously mixed by agitation with a motor for 10 minutes. The dispersion (c) was then added to the mixture and the resulting mixture was mixed by agitation for 1 minute. The dispersions (d) to (f) were added and mixed in this sequence in the same manner as dispersion (c). A 23 g of copper powder (product of Fukuda Metal Foil & Powder Co., Ltd., CE-8A) was added subsequently to the resulting mixture and mixed homogeneously for 30 seconds.

After agitating said mixture for 5 minutes, the following three dilute solutions of flocculants were added to the resulting mixture according to the process shown below.

(g) A 20 g of alumina sol (product of Nissan Chemical Industries, Ltd., alumina sol-520) diluted in 30 ml of tap water was added to the mixture mentioned above, the mixture was subsequently agitated for 1 minute.

(h) A 3 g of ammonium sulfate diluted in 20 ml of tap water was added to the mixture, the mixture was subsequently agitated for 1 minute.

(i) A 15 g of an acrylamide polymer flocculant (Arakawa Chemical Industries, Co., Ltd., Polystron 705) diluted in 50 ml of tap water was added to the mixture to agglomerate the mixture.

The agglomerate formed was filtered with a 100 mesh wire cloth made of stainless steel to give a filter cake on the wire cloth, the filter cake was then dried at 80° C. for 12 hours. The dried material compressed slightly for venting was molded at 170° C. and 11 MPa, postcured at 210° C. for 6 hours, and then heat-treated at 500° C. for 10 seconds to give friction material. Said rock wool, cashew dust, graphite, barium sulfate and copper powder functions as a friction modifier. Said phenolic resin functions as a binder. The precipitate separated from dilute solutions of flocculants (g) to (i) also function as a friction modifier.

Bending strength of a test piece (13 mm×125 mm×5 mm) cut from the friction material produced was determined under conditions of cross head speed of 2 mm/minute and span of 50 mm. The determination results are shown in table 1.

Coefficient of friction and wear rate of a test piece (25mm×25 mm×5 mm) cut from the friction material were determined according to the method according to JIS D 4411 with a constant speed chase machine. The determination conditions were 1MPa of surface pressure, 7.8 m/second of sliding rate, 10 minutes of determination time per one test, and 3 of number of determination. Determination temperature was 350° C. to compare with results of coefficient of friction and wear rate at high temperature.

The weighted mean fiber length of carbon fibers before and after mixing were determined by an image analysis method. The results of determination are shown in table 1. Table 1 has results of the other examples and comparative examples. In addition, it was confirmed by observing a structure of cut surface of the friction material with an optical microscope that friction material had substantially no pills, as shown in FIG. 1.

EXAMPLE 2

Friction material was prepared and evaluated in the same manner as in example 1 except that carbon fiber (product of Donac Co., Ltd., S-242; mean fiber diameter=13 μm, weighted mean fiber length=0.35 mm, tensile strength=800 MPa, tensile modulus of elasticity=40 GPa) was employed. The determination results are shown in table 1. In addition, it was confirmed by observing a cut surface of friction material with an optical microscope that friction material had substantially no pills.

EXAMPLE 3

Friction material was prepared and evaluated in the same manner as in example 1 except that carbon fiber (product Of Donac Co., Ltd., S-244; mean fiber diameter=13 μm, weighted mean fiber length=0.73 mm, tensile strength=800 MPa, tensile modulus of elasticity=40 GPa) was employed. The determination results are shown in table 1. In addition, it was confirmed by observing a cut surface of friction material with an optical microscope that friction material had substantially no pills.

EXAMPLE 4

Friction material was prepared and evaluated in the same manner as in example 1 except that carbon fiber (product of Donac Co., Ltd., S-246; mean fiber diameter=13 μm, weighted mean fiber length=1.2 mm, tensile strength=800 MPa, tensile modulus of elasticity=40 GPa) was employed. The determination results are shown in table 1. In addition, it was confirmed by observing a cut surface of friction material with an optical microscope that friction material had substantially no pills.

EXAMPLE 5

Friction material was prepared and evaluated in the same manner as in example 1 except that carbon fiber (product of Donac Co., Ltd., S-233; mean fiber diameter=13 μm, weighted mean fiber length=8.8 mm, tensile strength=800 MPa, tensile modulus of elasticity=40 GPa) was employed. The determination results are shown in table 1. In addition, it was confirmed by observing a cut surface of friction material with an optical microscope that friction material had substantially no pills.

EXAMPLE 6

Friction material was prepared and evaluated in the same manner as in example 1 except that carbon fiber (product of Donac Co., Ltd.; mean fiber diameter=13 μm, weighted mean fiber length=14.5 mm, tensile strength=800 MPa, tensile modulus of elasticity=40 GPa) was employed. The determination results are shown in table 1. In addition, it was confirmed by observing a cut surface of friction material with an optical microscope that friction material had substantially no pills.

EXAMPLE 7

Friction material was prepared and evaluated in the same manner as in example 1 except that a 9.2 g of carbon fiber (product of Donac Co., Ltd., S-242; mean fiber diameter=13 μm, weighted mean fiber length=0.35 mm, tensile strength= 800 MPa, tensile modulus of elasticity=40 GPa) was employed. The determination results are shown in table 1. In addition, it was confirmed by observing a cut surface of friction material with an optical microscope that friction material had substantially no pills.

EXAMPLE 8

Friction material was prepared and evaluated in the same manner as in example 1 except that 23.0 g of carbon fiber (product of Donac Co., Ltd., S-242; mean fiber diameter=13 μm, weighted mean fiber length=0.35 mm, tensile strength= 800 MPa, tensile modulus of elasticity=40 GPa) was employed. The determination results are shown in table 1. In addition, it was confirmed by observing a cut surface of friction material with an optical microscope that friction material had substantially no pills.

EXAMPLE 9

Friction material was prepared and evaluated in the same manner as in example 1 except that wollastonite (product of Maruwa Biochemical Co., Ltd., KEMOLIT) was employed in place of rock wool. The determination results are shown in table 1. In addition, it was confirmed by observing a cut surface of friction material with an optical microscope that friction material had substantially no pills.

EXAMPLE 10

Friction material was prepared and evaluated in the same manner as in example 9 except that sepiolite (product of Omi Mining Co., Ltd., MIRACLAY) was employed in place of wollastonite. The determination results are shown in table 1. In addition, it was confirmed by observing a cut surface of friction material with an optical microscope that friction material had substantially no pills.

EXAMPLE 11

Friction material was prepared and evaluated in the same manner as in example 1 except that carbon fiber (product of Donac Co., Ltd., S-242; mean fiber diameter=13 μm, weighted mean fiber length=0.35 mm, tensile strength=800 MPa, tensile modulus of elasticity=40 GPa) was employed and that an amount of tap water in (a) to (i) was employed 15 times as much as in example 1. The determination results are shown in table 1. In addition, it was confirmed by observing a cut surface of friction material with an optical microscope that friction material had substantially no pills.

EXAMPLE 12

Friction material was prepared and evaluated in the same manner as in example 2 except that carbon fiber (product of Donac Co., Ltd., S-242; mean fiber diameter=13 μm, weighted mean fiber length=0.35 mm, tensile strength=800 MPa, tensile modulus of elasticity=40 GPa) was employed and that an amount of tap water in (a) to (f) was employed ⅓ times as much as in example 1. The determination results are shown in table 1. In addition, it was confirmed by observing a cut surface of friction material with an optical microscope that friction material had substantially no pills.

EXAMPLE 13

Friction material was prepared and evaluated in the same manner as in example 2 except that carbon fiber (product of Donac Co., Ltd., S-242; mean fiber diameter=13 μm, weighted mean fiber length=0.35 mm, tensile strength=800 MPa, tensile modulus of elasticity=40 GPa) was employed; that the amount of water of (a) was 200 ml; that a solid content of each of (b) to (f) were added without dilution with tap water; that (g) and (h) were prepared without dilution with tap water; and that the amount of water of (i) was 30 ml. The determination results are shown in table 1. In addition, it was confirmed by observing a cut surface of friction material with an optical microscope that friction material had substantially no pills.

EXAMPLE 14

Each dispersion was prepared according to the following procedure.

(a) A 2.3 g of tentacle-like branched (fibrillated) aramid fiber (product of Dupont Toray Kevlar Co., Ltd., KEVLAR DRY PULP 1F-302; weighted mean fiber length= 2.0 mm) was dispersed in 750 ml of tap water by agitation with a motor for 2 hours.

(b) A 2.3 g of carbon fiber (product of Donac Co., Ltd., S-231; mean fiber diameter=13 μm, weighted mean fiber length=3.0 mm, tensile strength=800 MPa, tensile modulus of elasticity=40 GPa) was dispersed in 375 ml of tap water by agitation with a motor for 1 minute.

(c) A 5.7 g of rock wool (Nihon Cement Co., Ltd., CMF#3,000) was dispersed in 375 ml of tap water by agitation with a motor for 30 minutes.

(d) A 11.4 g of phenolic resin (product of Kanebo Ltd., BELLPEARL S-899) was dispersed in 125 ml of tap water with a spatula.

(e) A 6.8 g of cashew dust (product of Cashew Co., Ltd., H-9109) was dispersed in 125 ml of tap water with a spatula.

(f) A 18.4 g of graphite (product of Chuetsu Graphite Works Co., Ltd., G-3) was dispersed in 125 ml of tap water with a spatula.

(g) A 42 g of barium sulfate (product of Sakai Chemical Industry Co., Ltd., A-15) was dispersed in 125 ml of tap water with a spatula.

The above-mentioned dispersions (a) to (c) were combined and homogeneously mixed by agitation with a motor for 10 minutes. The dispersion (d) was added to the mixture and the resulting mixture was mixed by agitation for 1 minute. The dispersions (e) to (g) were added and mixed in this sequence in the same manner as dispersion (d). A 23 g of copper powder (product of Fukuda Metal Foil & Powder Co., Ltd., CE-8A) was added subsequently to the mixture and the resulting mixture was mixed homogeneously for 30 seconds.

Friction material was prepared and evaluated in the same manner as in example 1 using the homogeneous mixture mentioned above. The determination results are shown in table 1. In addition, it was confirmed by observing a cut surface of friction material with an optical microscope that friction material had substantially no pills.

EXAMPLE 15

Friction material was prepared in the same manner as in example 14 except that the amount of all materials were employed 2.5 times as much as in example 14, to obtain test pieces from the surface vertical to the direction to which pressure was applied. The test pieces subjected to bending and friction tests were cut from the surface vertical to the direction to which pressure was applied. The test pieces were evaluated in the same manner as in example 1. The determination results are shown in table 1. In addition, it was confirmed by observing a cut surface of friction material with an optical microscope that friction material had substantially no pills. The proportion of fibers having a ratio of longer/shorter diameter of 2 or less was determined by the following method, and found to be 60% on the average. Three test pieces were prepared as above. Each test piece was observed at five points on the cut surface with a polarization microscope (200-fold). This operation was repeated 15 times (n=15) to determine the average proportion.

EXAMPLE 16

Friction material was prepared and evaluated in the same manner as in example 14 except that carbon fiber prepared from anisotropic pitch (product of Donac Co., Ltd.; mean fiber diameter=11 μm, weighted mean fiber length=3.1 mm, tensile strength=1.8 GPa, tensile modulus of elasticity=130 GPa) was employed in place of carbon fiber of (b). The determination results are shown in table 1. In addition, it was confirmed by observing a cut surface of friction material with an optical microscope that friction material had substantially no pills.

EXAMPLE 17

Friction material was prepared and evaluated in the same manner as in example 14 except that carbon fiber was not employed. The determination results are shown in table 1. In addition, it was confirmed by observing a cut surface of friction material with an optical microscope that friction material had substantially no pills.

EXAMPLE 18

Friction material was prepared and evaluated in the same manner as in example 14 except that carbon fiber having a weighted mean fiber length of 0.12 mm was employed in place of carbon fiber of (b). The determination results are shown in table 1. When the results were compared with the results of example 14, the friction material of example 18 is lower in bending strength and coefficient of friction and higher in wear rate. This is because the weighted mean fiber length of carbon fiber employed in example 18 is smaller. Further, when compared with example 17, the friction material of example 18 is lower in average coefficient of friction, but improved in wear rate.

EXAMPLE 19

Friction material was prepared in the same manner as in example 1 except that the amount of all materials was employed 2.5 times as much as in example 1, to obtain test pieces from the surface vertical to the direction to which pressure was applied. Test pieces subjected to bending and friction tests were cut from the surface vertical to the direction to which pressure was applied. The test pieces were evaluated in the same manner as in example 1. The determination results are shown in table 1. In addition, it was confirmed by observing a cut surface of friction material with an optical microscope that friction material had substantially no pills. The proportion of fibers placed on the cut surface and having a ratio of longer/shorter diameter of 2 or less was determined in the same manner as in example 15, and found to be 65% on the average.

COMPARATIVE EXAMPLE 1

Friction material was prepared and evaluated in the same manner as in example 1 except that carbon fiber having weighted mean fiber length of 0.12 mm was employed. The determination results are shown in table 1. When compared with the results of examples 1–5, the friction material of comparative example 1 is lower in bending strength and average coefficient of friction.

COMPARATIVE EXAMPLE 2

Friction material was prepared according to the process shown below with the constituents of (a) to (f) in example 1 and copper powder provided that tap water as a dispersion medium was not employed.

The carbon fiber was opened for 10 seconds with PHOENIX BLENDER (product of Oster Co., Ltd.), to which rock wool, phenolic resin, cashew dust, graphite, barium sulfate and copper powder were added in this sequence and mixed by dry agitation for 10 seconds after every addition of each constituent to give mixture A. To the mixture A was added the material prepared by filtering, drying and grinding in a mortar a precipitate separated from a mixed solution of (g) to (i) in example 1, and the resulting mixture was mixed for 10 seconds.

Figure 2:
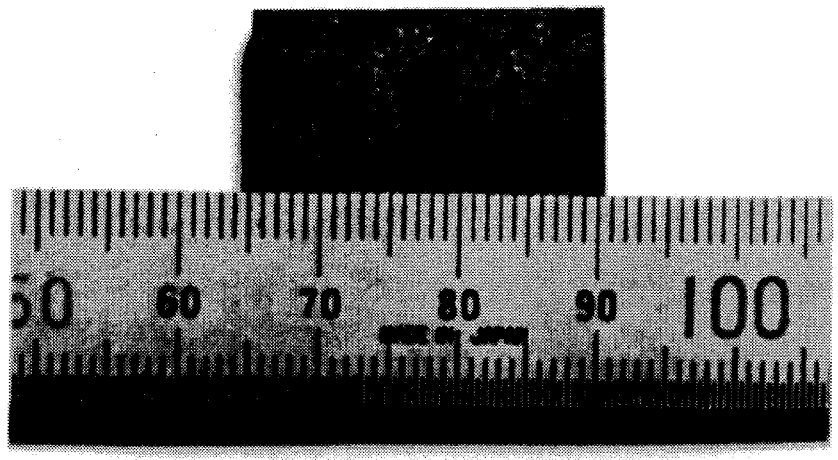
FIG. 2 is a photograph of optical microscope showing a cutting surface of friction material prepared in Comparative Example 2.

Friction material was prepared and evaluated in the same manner as in example 1 employing the mixture thus obtained. The determination results are shown in table 1. In addition, it was confirmed by observing a cut surface of friction material with an optical microscope that friction material had pills, as shown in FIG. 2. When compared with the results of example 1, the friction material of comparative example 2 is lower in bending strength and average coefficient of friction and higher in wear rate.

COMPARATIVE EXAMPLE 3

Friction material was prepared and evaluated in the same manner as in comparative example 2 except that carbon fiber (product of Donac Co., Ltd.; mean fiber diameter=13 μm, weighted mean fiber length=22.5 mm, tensile strength=800 MPa, tensile modulus of elasticity=40 GPa) was employed. The determination results are shown in table 1. In this case, any average measured value can not be demonstrated as data due to highly scattering results of strength, coefficinnt of friction and wear rate. In addition, it was confirmed by observing a cut surface of friction material with an optical microscope that friction material had pills, similarly to comparative example 2.

COMPARATIVE EXAMPLE 4

Friction material was prepared and evaluated in the same manner as in comparative example 2 provided that the material employed and composition of friction material were the same as example 17. The determination results are shown in table 1. In addition, it was confirmed by observing a cut surface of friction material with an optical microscope that friction material had pills, similarly to comparative example 2. When compared with the results of example 17, the friction material of comparative example 4 is lower in bending strength and higher in wear rate.

In table 1, "CF" means carbon fiber.

TABLE 1

| | CF Length (mm) | Amount of CF (wt. %) | Bending Strength (kg/mm$^2$) | Average Coefficient of Friction | Wear Rate ($10^{-7}$ cm$^3$/ kgf · m) |
| --- | --- | --- | --- | --- | --- |
| Ex. 1 | 2.8 | 2 | 5.5 | 0.30 | 2.0 |
| Ex. 2 | 0.36 | 2 | 4.3 | 0.28 | 1.8 |
| Ex. 3 | 0.74 | 2 | 4.5 | 0.28 | 1.7 |
| Ex. 4 | 1.3 | 2 | 4.8 | 0.29 | 2.2 |
| Ex. 5 | 8.4 | 2 | 5.1 | 0.32 | 2.4 |
| Ex. 6 | 14.2 | 2 | 4.6 | 0.32 | 2.7 |
| Ex. 7 | 0.36 | 8 | 4.5 | 0.27 | 1.6 |
| Ex. 8 | 0.32 | 18 | 4.7 | 0.26 | 1.4 |
| Ex. 9 | 3.2 | 2 | 4.8 | 0.32 | 1.8 |
| Ex. 10 | 3.0 | 2 | 5.0 | 0.33 | 1.7 |
| Ex. 11 | 0.32 | 2 | 4.5 | 0.28 | 1.8 |
| Ex. 12 | 0.35 | 2 | 4.2 | 0.28 | 1.9 |
| Ex. 13 | 0.37 | 2 | 4.1 | 0.28 | 2.1 |
| Ex. 14 | 2.7 | 2 | 5.0 | 0.32 | 2.7 |
| Ex. 15 | 3.2 | 2 | 4.5 | 0.34 | 1.3 |
| Ex. 16 | 2.7 | 2 | 5.5 | 0.34 | 2.3 |
| Ex. 17 | — | — | 4.0 | 0.38 | 6.5 |
| Ex. 18 | 0.11 | 2 | 3.5 | 0.26 | 3.5 |
| Ex. 19 | 2.6 | 2 | 4.9 | 0.34 | 0.9 |
| Comp. Ex. 1 | 0.10 | 2 | 3.0 | 0.22 | 1.8 |
| Comp. Ex. 2 | 2.1 | 2 | 3.4 | 0.26 | 3.1 |
| Comp. Ex. 3 | 16.7 | 2 | — | — | — |
| Comp. Ex. 4 | — | — | 3.2 | 0.36 | 8.9 |

As shown in table 1, the friction material of the invention is excellent in bending strength, coefficient of friction and wear rate.

In contrast, the friction material of the comparative examples, which does not satisfy the required conditions of the invention, is low in bending strength and coefficient of friction, and high in wear rate.

What we claimed is:

1. A method for producing friction material having pills with a largest dimension no greater than 2 mm comprising:

mixing carbon fibers having a weighted mean fiber length of at least 0.3 mm, an effective amount of a binder to bind the carbon fibers, and an effective amount of a friction modifier to provide a sufficient and stable friction coefficient to a resulting friction material together with an effective amount of a dispersing medium to disperse the carbon fibers, the binder and the friction modifier, and forming a dispersion with a solid content concentration of 0.5 to 50% by weight, removing the dispersing medium from the dispersion by filtering the dispersion through a filter fabric and forming a filter cake on the filter fabric, drying the filter cake, and molding the filter cake.

2. The method for producing friction material according to claim 1, wherein the carbon fibers are present in an amount of 0.5 to 20% by weight of the solid contents.

3. A method for producing friction material having pills with a largest dimension no greater than 2 mm, a friction surface and carbon fiber transversely oriented relative to the friction surface, which comprises:

mixing carbon fibers having a weighted mean fiber length of at least 0.3 mm, an effective amount of a binder to bind the carbon fibers, and an effective amount of a friction modifier provide a sufficient and stable friction coefficient to a resulting friction material in an effective amount of a dispersing medium to disperse the carbon fibers, the binder and the friction modifier, and forming a dispersion with a solid content concentration of 0.5 to 50% by weight, removing the dispersing medium from the dispersion and orienting the carbon fibers by filtering the dispersion through a filter fabric while orienting the carbon fibers substantially parallel to the filter fabric, and forming a filter cake on the filter fabric, drying the filter cake, followed by:
(1) cutting the dried filter cake in a direction perpendicular to the orientation of the carbon fibers and molding the resulting cut-dried filter cakes, or
(2) molding the filter cake and cutting the molded-dried filter cake in a direction perpendicular to the orientation of the carbon fibers.

4. A method for producing friction material having pills with a largest dimension no greater than 2 mm comprising:

mixing branched organic fibers having a weighted mean fiber length of at least 0.3 mm and a mean fiber diameter of up to 50 μm, an effective amount of a binder to bind the organic fibers, and an effective amount of a friction modifier provide a sufficient and stable friction coefficient to a resulting friction material together with an effective amount of a dispersing medium to disperse the organic fibers, the binder and the friction modifier, and forming a dispersion with a solid content concentration of 0.5 to 50%, removing the dispersing medium from the dispersion by filtering the dispersion through a filter fabric and forming a filter cake on the filter fabric, drying the filter cake, and molding the filter cake.

5. The method for producing friction material according to claim 4, wherein the mixing includes mixing carbon fibers having a weighted mean fiber length of at least 0.05 mm together with the branched organic fibers, the binder, the friction modifier and the dispersing medium.

* * * * *